(12) United States Patent
Lin

(10) Patent No.: US 8,830,567 B2
(45) Date of Patent: Sep. 9, 2014

(54) FIBER LASERS FOR PRODUCING AMPLIFIED LASER PULSES WITH REDUCED NON-LINEARITY

(75) Inventor: Anthoney Hong Lin, Palo Alto, CA (US)

(73) Assignee: Calmar Optcom, Inc., Palo Alto, CA (US)

( * ) Notice: Subject to any disclaimer, the term of this patent is extended or adjusted under 35 U.S.C. 154(b) by 217 days.

(21) Appl. No.: 13/462,620

(22) Filed: May 2, 2012

(65) Prior Publication Data

US 2012/0217375 A1    Aug. 30, 2012

Related U.S. Application Data

(63) Continuation-in-part of application No. 12/829,364, filed on Jul. 1, 2010, now Pat. No. 8,730,570.

(60) Provisional application No. 61/269,979, filed on Jul. 1, 2009.

(51) Int. Cl.
| | |
|---|---|
| *H04B 10/17* | (2006.01) |
| *H01S 3/10* | (2006.01) |
| *G02F 1/35* | (2006.01) |
| *H04B 10/508* | (2013.01) |
| *H01S 3/067* | (2006.01) |
| *H01S 3/00* | (2006.01) |
| *H01S 3/23* | (2006.01) |

(52) U.S. Cl.
CPC ........... *H01S 3/0057* (2013.01); *H01S 3/06758* (2013.01); *H01S 3/005* (2013.01); *H01S 3/0092* (2013.01); *H01S 3/2316* (2013.01); *H04B 10/508* (2013.01)
USPC ......................................... 359/341.1; 372/25

(58) Field of Classification Search
USPC .................................. 372/25; 359/333, 341.1
See application file for complete search history.

(56) References Cited

U.S. PATENT DOCUMENTS

| | | | |
|---|---|---|---|
| 7,844,146 B2 * | 11/2010 | Nicholson et al. | ............... 385/33 |
| 2003/0156605 A1 * | 8/2003 | Richardson et al. | ............ 372/25 |
| 2005/0105865 A1 * | 5/2005 | Fermann et al. | ............... 385/122 |
| 2009/0285245 A1 | 11/2009 | Liu | |
| 2011/0211598 A1 | 9/2011 | Liu | |

* cited by examiner

*Primary Examiner* — Eric Bolda
(74) *Attorney, Agent, or Firm* — SV Patent Service

(57) ABSTRACT

A chirped-pulsed amplification laser device includes a fiber laser driver, a laser head, and a delivery fiber that guides amplified stretched laser pulses from the laser driver to the laser head. The fiber laser driver includes a seed pulsed laser, a pulse stretcher, and an optical power amplifier. A chirped fiber Bragg grating compressor in the laser head includes a fiber terminal section configured to minimize broadening of the amplified stretched laser pulses, a chirped fiber Bragg grating section connected to the fiber terminal section and configured to compress and reflect amplified stretched laser pulses to produce reflected laser pulses with compressed pulse durations, and a collimator housing configured to fixedly hold a collimator lens and a ferrule. The ferrule holds the fiber terminal section tilted relative to an optical axis of the collimator lens.

16 Claims, 11 Drawing Sheets

FIBER LASERS FOR PRODUCING AMPLIFIED LASER PULSES WITH REDUCED NON-LINEARITY

PRIORITY CLAIM

The present patent application is a continuation-in-part application of and claims priority to U.S. patent application Ser. No. 12/829,364 entitled "Optical pulse compressing based on chirped fiber Bragg gratings for pulse amplification and fiber lasers", filed Jul. 1, 2010, now U.S. Pat. No. 8,730,570 which claims the benefits of the U.S. provisional application No. 61/269,979 entitled "Chirped fiber Bragg grating (CFBG) optical pulse compressor for all fiber chirped pulse amplifier system" and filed by Anthony Hong Lin on Jul. 1, 2009, the entire disclosure of which is incorporated by reference as part of this document.

BACKGROUND OF THE INVENTION

This document relates to generation and control of laser pulses, including pulse compressor and laser pulse amplifiers and pulsed lasers.

Various optical amplifiers are designed to amplify light by providing an optical gain at the same wavelength of the light to be amplified so that the light, after transmitting through an optical gain medium of the optical amplifier, is amplified in its power or energy and the amplified light is at the same wavelength of the original light prior to the amplification. The optical gain of the optical amplifier can be obtained by pump light that optically excites the optical gain medium such as a Nd or Yb doped fiber amplifier, or by an electrically energized gain medium such as a semiconductor optical amplifier based on quantum wells and other gain mechanisms.

To minimize non-linear effects, the laser pulses are often stretched before amplification and compressed again after the amplification. A conventional pulse-compression method uses Chirped fiber Bragg grating (CFBG) in which a CFBG fiber is spliced with a lead fiber transmitting the amplified laser pulses. The state-of-art fiber splicing uses a cleaving machine that requires a fiber lead length of about 0.1 to 1 meter. A major drawback of the conventional techniques is that the significant lead fiber length produces large non-linear effects which affect the quality of the output laser pulses.

SUMMARY OF THE INVENTION

The present application discloses a compact fiber laser that include a CFBG compressor and micro optical components which reduce the fiber length and minimize nonlinear effect in the laser pulses, in comparison to conventional fiber laser systems.

The use of micro optical components in a CFBG pulse compressor makes the disclosed laser device compact. The use of free-space optical paths reduces lead fiber length (fiber terminal section) for CFBG shorter than 2 cm, a factor of 1/10 or smaller than the lead fiber length in conventional fiber laser systems. As a result, the nonlinear effects associated with CFBG compressor are reduced by a factor of 10-100 lower comparing to conventional fiber splicing techniques. The quality of the output amplified laser pulses is significantly improved.

Moreover, the disclosed CPA laser device can be made very robust. A ferrule is used to host a fiber lead, and the glass ferrule has the same thermal expansion coefficient to make the device stable over wide temperature range. It also reduces the mechanical stresses that the fiber lead produced in the CFBG. The thermal and mechanical stabilities are critical to providing stable dispersion effects in the CFBG pulse compressor.

This document describes techniques and devices for using a chirped fiber Bragg grating to compress amplified laser pulses and applications in pulse amplification devices and pulse fiber lasers. Various implementations are described in detail in the drawings, the description and the claims.

BRIEF DESCRIPTION OF THE DRAWINGS

FIG. 5A shows the pulse parameter before nonlinear pulse compression and FIG. 5B shows the pulse parameter after nonlinear pulse compression.

DETAILED DESCRIPTION OF THE INVENTION

Figure 1A:
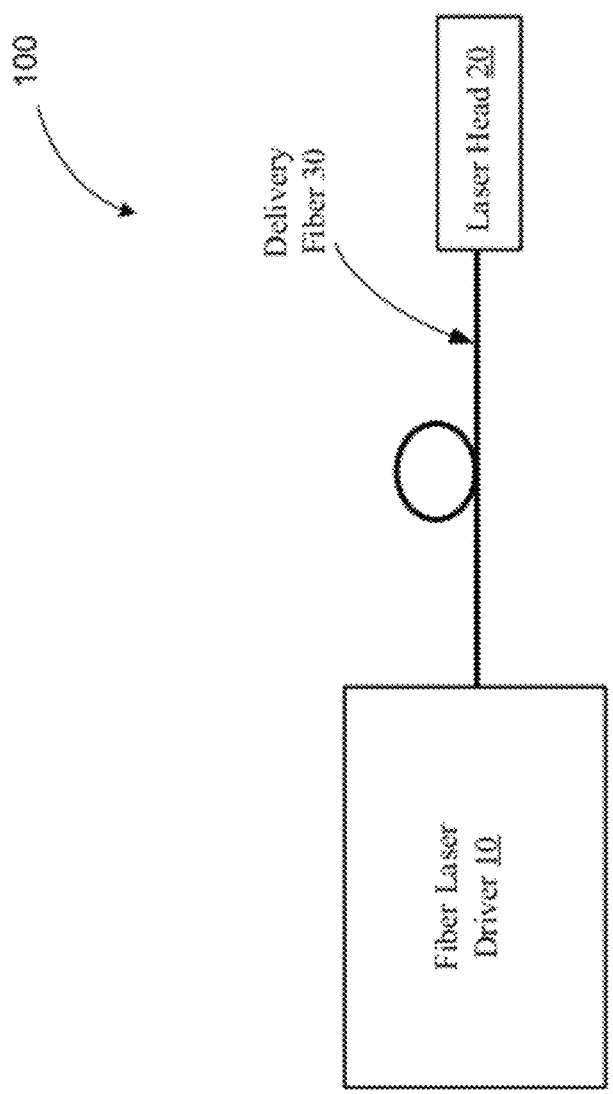
FIG. 1A is a block diagram of a fiber-based chirped-pulsed amplification (CPA) device in accordance with the present invention.

Optical fiber can exhibit nonlinear optical effects when used in optical devices. Such nonlinear optical effects in optical fiber can be undesirable in some application while desirable in others.

For example, stimulated Raman Scattering (SRS) is a nonlinear optical interaction of light and optical phonon in the material when the intensity of light at an optical wavelength exceeds a SRS threshold. When SRS occurs, a Raman signal is generated in the same propagation direction of the original light by the non-linear SRS process in the medium at a Raman frequency that is shifted from the optical frequency of the original light by a Raman frequency detuning. The Raman frequency is usually lower than the frequency of the original light and can be higher than the frequency of the original light. In SRS, the original light acts as the pump light for generating the Raman signal and the energy of the original light is depleted and is transferred into the Raman signal via the SRS process. The SRS process in silica fiber, for example, has a Raman frequency detuning of 13.2 THz.

The SRS can lead to undesired effects in laser pulse amplification in fibers and other optical media. For example, as the intensity of the laser pulses increases to reach the SRS threshold level, the optical power in the laser pulses is depleted and thus the SRS process puts an upper limit to the optical power of the laser pulses.

In addition, optical nonlinear effects such as self-phase modulation (SPM) based on Kerr effect can accumulate as the pulses propagate and SPM usually generate new spectral components and nonlinear chirp, making it difficult to obtain short pulses which are desirable in various pulsed laser applications, such as laser material processing and other applications. Therefore, various laser pulse amplification techniques are developed to first stretch the laser pulses in the time domain to reduce the pulse peak power under the SRS threshold and to mitigate the accumulation of the optical nonlinear effects during the optical amplification process. After amplification of the stretched laser pulses, the amplified laser pulses are then compressed in time to produce desired short laser pulses.

In this regard, consider fiber lasers and amplifiers. Fiber lasers and amplifiers can have certain advantages over other laser and amplifier systems, such as compactness, maintenance-free operation, and cost-effectiveness. Due to the waveguiding nature, fibers can provide good beam quality in guided light without the need of complex optics for shaping the optical beam. The waveguiding nature of fibers, however, also renders it difficult to amplify short pulses with high peak power levels. Notably, small fiber cores in fibers lead to high optical intensity of the confined light and thus trigger optical nonlinear effects. Certain fiber amplifier systems are implemented based the chirped-pulsed amplification (CPA) to avoid or mitigate the undesired nonlinearity accumulation in fiber carrying laser pulses. In CPA, the laser pulse is first stretched in the time domain to reduce its peak power and the nonlinearity accumulation inside the high gain fiber amplifiers, and subsequently, amplified stretched pulses are compressed. In order to obtain higher energy output pulses, the stretching of the laser pulses is increased to increase the ratio between the stretched pulse duration and the compressed pulse duration. A pulse stretcher can be implemented with optical fiber or a CFBG to provide a fiber compatible package without requiring bulky free space optics. Such fiber systems may need to adopt free-space optics such as diffraction gratings to provide sufficient pulse compression. However, adopting free-space optics may compromise the long-term reliability and the compactness of the fiber system. In addition, it can be difficult to achieve very short pulses after the recompression due to various factors. For example, pulse stretching and compression are usually done with a large ratio, such as a pulse stretch to 100 ps (e.g., up to 1 ns to 2 ns) in the pulse duration and a pulse compression down to 0.1 to 0.2 ps in the pulse duration. Such a compression ratio of 1000 (up to 10,000 to 20,000) to 1 or 2 require precision match of the dispersion signs and magnitudes of the pulse stretcher and the pulse compressor while taking into account of the contribution of other fiber components along the paths of the laser pulses. For another example, the higher-order dispersion is not perfectly compensated, either by mismatching between the stretcher and compressor or the accumulation of higher order dispersion during the amplification.

In the devices and techniques described in this document, a pulse stretcher is used upstream from the optical power amplifier to reduce the pulse peak power and a pulse compressor is placed downstream of the optical power amplifier to compress the pulse duration and to increase the pulse peak power. The compressor can produce a relatively high peak output power and thus propagation of such compressed laser pulses in fiber can lead undesired nonlinear optical effects and pulse broadening. In the exemplary implementations of the devices and techniques described in this document, the output optical path of the compressed laser pulses by the pulse compressor is separate from the input optical path which can be a fiber line and is primarily in free space based on free space optics to reduce the undesired nonlinear optical effects and pulse broadening in the post-compression process.

In practical implementations, it can be beneficial to have either the dispersion of the pulse stretcher or/and pulse compressor finely tunable during the final optimization of the system to achieve short laser pulses. In implementing the devices and techniques described in this document, a combination of a fiber pulse stretcher and a CFBG compressor can be used to provide desired fine tunablity of the pulse stretcher dispersion to achieve a short pulse at the CFBG compressor. For example, to achieve 0.1 ps compressed pulse, the dispersion mismatch may be set to be less than 0.005 $ps^2$ which corresponds to a fiber length of 0.2 m based on the fact that the fiber dispersion at 1550 nm is about 0.025 $ps^2$/m. This is a convenient length to control using standard fiber fusion splicer during the final stage of making the compressed pulse. Since the CFBG can be design to have a wide range of group velocity dispersion (GVD) values and higher order dispersion, the CFBG compressor can be designed to achieve a wide range of compression ratios. The combination of fiber pulse stretcher and CFBG compressor offer design stage flexibility as well as fine tuning capability at manufacturing stage.

The parabolic pulse amplification technique is an alternative to the CPA technique and uses the normal dispersion in optical fibers in combination with a positive gain in the fiber amplifier to produce a linearly chirped stretched laser pulse. In the parabolic pulse amplification, both the spectral and temporal pulse shape exponentially broadens along the fiber. The broadening factor depends on the input pulse energy and the gain in the amplifying fiber. The stretched parabolic pulse may be subsequently compressed through another fiber-type element, such as photonic crystal fibers. Thus, the combination of the parabolic pulse amplification technique along with the pulse-compression photonic crystal fiber can be used to achieve an all-fiber high energy short-pulse laser system.

Referring to FIG. 1A, a fiber CPA device 100 includes a fiber laser driver 10 and a laser head 20 which are connected by a deliver fiber 30.

Figure 1B:
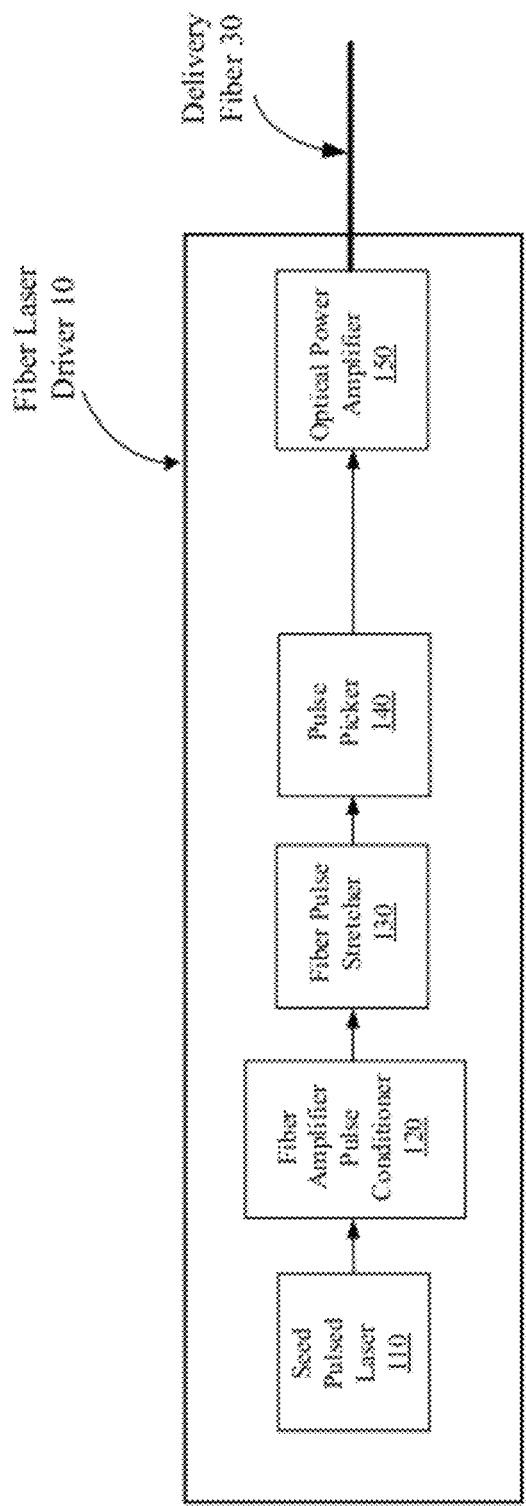
FIG. 1B is a block diagram of the fiber laser driver in the fiber-based CPA device in FIG. 1A.

Referring to FIG. 1B, the fiber laser driver 10 includes a seed pulsed laser 110 to generate laser light of short laser pulses having pulse widths in the sub-picosecond to piconseconds range. The seed pulsed laser 110 can be implemented by a mode locked fiber laser. The wavelength of the laser light from the seed pulsed laser 110 can be in various wavelengths, such as within the spectral band of Er, Er/Yb fibers around 1.55 μm, Yb fibers around 1 μm, Ho fibers around 2 μm or other rear earth element doped fiber gain bands. The laser power of the seed pulsed laser 110 can be in various ranges, e.g., few miliwatts. The output of the seed pulsed laser 110 can be fed into an optional fiber amplifier/pulse conditioner 120 which is designed to boost up the pulse energy from the seed pulsed laser 110. The fiber amplifier/pulse conditioner 120 can also recondition the laser pulse to have a desirable characteristic for the whole CPA device. One of characteristics, for example, is to have a wide bandwidth of the laser pulses. A wide bandwidth enables a short compressed pulse width at output. Another example of desirable characteristics is a linear chirp in the wide spectral width. Linear chirp makes it feasible to compress the stretched pulse to a high quality low pedestal pulse. As an example, a fiber amplifier with a normal dispersion can be used in the fiber to achieve both high energy and linear chirp output. Such a pulse amplifier is known as a parabolic amplifier. In various implementations, the input of parabolic fiber amplifier should have an appropriate energy and other parameters within a wide boundary. Under proper operating conditions, the parabolic amplifier can produce a linear chirp output at a high energy with stable output characteristics. The output of a parabolic fiber amplifier can be insensitive to the parameters of input pulse and this property can improve the stability of the CPA system. In some implementations, the Fiber Amplifier/Pulse conditioner 120 in FIG. 1B may be eliminated, e.g., when the seed pulsed laser 110 already produces desired characteristic for the CPA system.

The fiber laser driver 10 also includes a fiber pulse stretcher 130 configured to stretch laser pulses to wider pulse widths. The fiber pulse stretcher 130 can be implemented by a device with group velocity dispersion. The fiber pulse stretcher 130 is constructed based on an optical fiber to provide robust operation, compact size and lightweight than bulk grating based stretchers. For example, a fiber pulse stretcher can be a fiber grating stretcher which is constructed by, for example, (1) a single mode fiber (polarization maintaining or non-polarization maintaining) with its material dispersion and waveguide dispersion, or (2) a Chirp Fiber Bragg Grating (CFBG). Some of advantages of using a single fiber pulse stretcher are that such a pulse stretcher is adjustable and readily available at a relatively low price. The fiber pulse stretcher 130 can be designed so that the dispersion of the fiber pulse stretcher 130 is adjustable to facilitate the device optimization. For example, the dispersion of the adjustable fiber pulse stretcher 130 can be finely tuned at the final stage of the CPA system optimization. The widely available fiber fusion splicing technology makes it easy to fine tune the fiber length of the fiber pulse stretcher 130 with ease and good reliability. The advantage of a CFBG stretcher is compact and highly engineerable characteristics such as second order dispersion and third order dispersion. Fiber pulse stretchers can be designed to stretch a pulse to few picoseconds to several nanoseconds.

Optionally, the fiber laser driver 10 can include a pulse picker 140 positioned after or before the fiber pulse stretcher 130. The pulse picker 140 is configured to modify the pulse repetition rate to a lower rate by picking pulses of a pulse train to produce a modified pulse train at a lower pulse repetition rate. The pulse picker 140 can be implemented by an Acoustic Optical (AO) modulator or an Electro Optical (EO) modulator. Such a modulator is driven by an electrical gating signal to pick pulses from pulses generated by the seed pulsed laser 110. As such, the pulse picker 140 reduces the number of pulses for further amplification. This allows a higher energy per pulse to be achieved. The pulse picker 140 is not used in systems where the seed pulsed laser 110 produces a pulse train at a desirable pulse repetition rate.

The fiber laser driver 10 includes an optical power amplifier 150 for boosting the laser pulse energy. The optical power amplifier 150 can be implemented in various configurations, such as, a core pump fiber amplifier, a double clad fiber amplifier, a combination of a core pump fiber amplifier and a double clad fiber amplifier, and other amplifier designs such as solid state laser amplifiers. A solid state laser gain medium can be optically pumped by, e.g., diode lasers or flash light pump. In various amplifier designs, solid state laser amplifiers can be used to provide the last stage amplification in a multistage amplifier design due to their large cross sections. Exemplary materials used for solid state amplifiers include Nd:YAG, YLF, Nd:glass, and others.

The optical power amplifier 150 can include two or more stages of optical amplifiers cascaded in series. Multistage amplifiers can offer higher gains than single stage amplifiers. Although it is possible to design a single stage amplifier with a large gain, a single stage large gain amplifier in many designs tends to suffer the drawback of large backward amplified spontaneous emission (ASE) noise and low power efficiency. One example for implementing the optical power amplifier 150 can include a fiber core amplifier, a double clad fiber amplifier, and then a large core double clad amplifier. The last stage of the optical power amplifier 150 in a multistage amplifier design can be a solid state laser amplifier to achieve a high output peak power without suffering nonlinear effects due to less focused beam on the solid state laser material.

One design consideration for the optical power amplifier 150 is to have low nonlinear effects. The self-phase modulation (SPM), a nonlinear effect commonly occurs in fiber, can make the output pulse difficult to compress. Raman effects in fiber can undesirably shift the wavelength of the output beam to a longer value. These and other nonlinear effects are related to the power intensity in the amplifier. The fiber pulse stretcher 130 upstream from the optical power amplifier 150 produces stretched pulses to reduce the peak power of the laser pulses entering the optical power amplifier 150. In addition to using the fiber pulse stretcher 130, the nonlinear effects in the laser pulses can also be reduced by using short fiber with a large core area which reduces the optical intensities of the laser pulses. To minimize non-linear effects of the amplified and thus higher laser pulses, the optical power amplifier 150 is positioned as close to the output end of the fiber laser driver as possible.

Figure 1C:
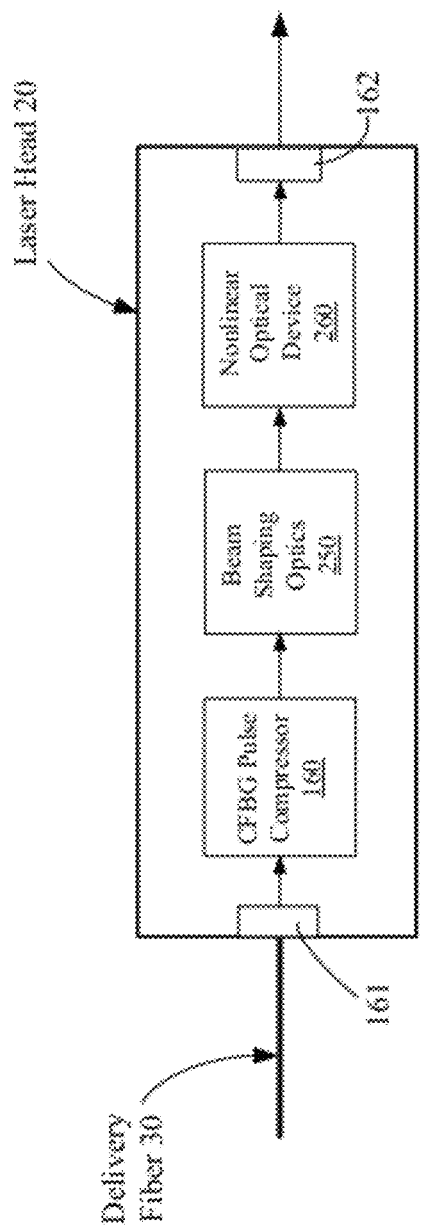
FIG. 1C is a block diagram of the laser head in the fiber-based CPA device in FIG. 1A.
Figure 2:
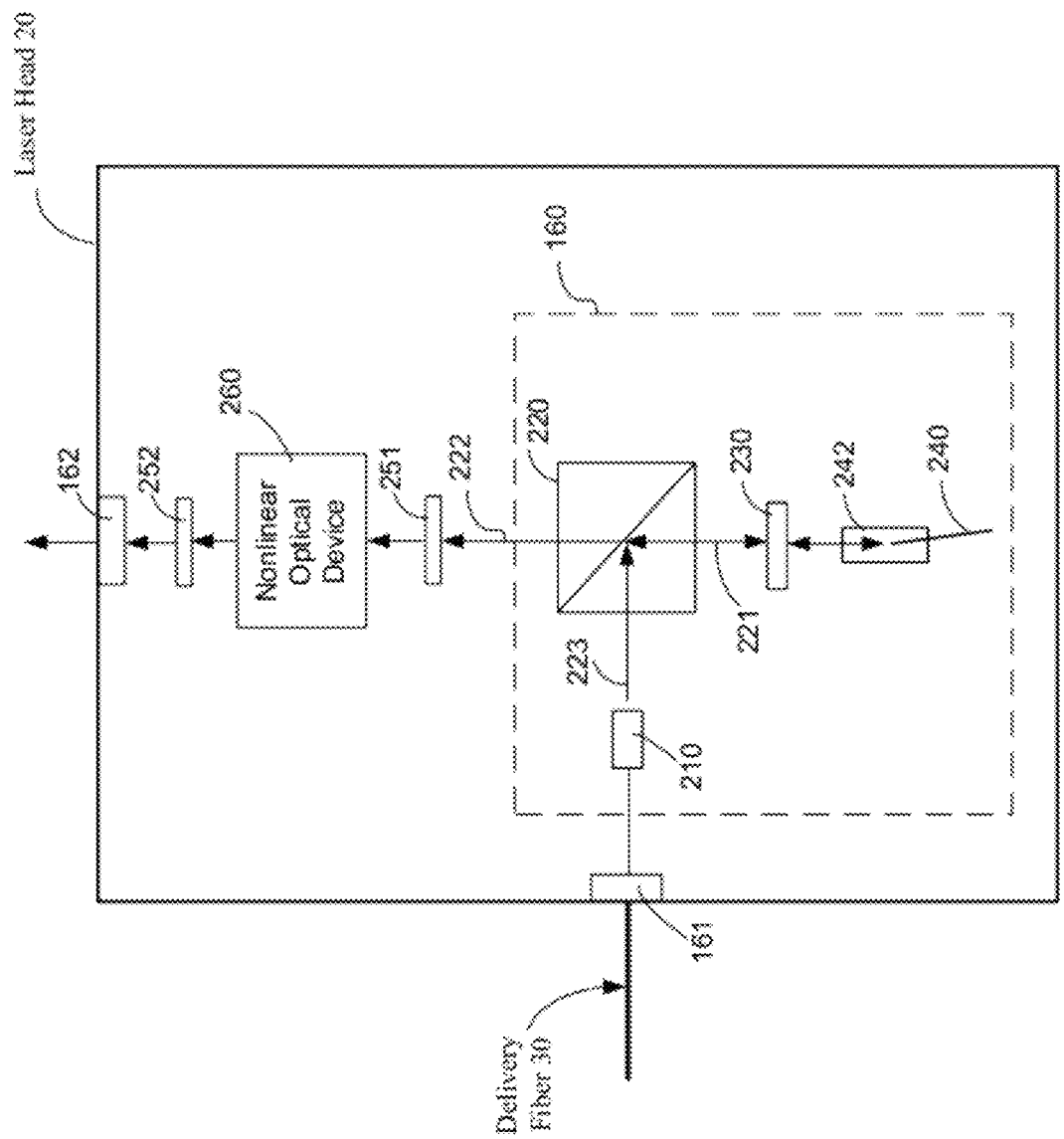
FIG. 2 shows a chirped fiber Bragg grating (CFBG) pulse compressor suitable for the fiber-based CPA device in FIG. 1A.
Figure 3A:
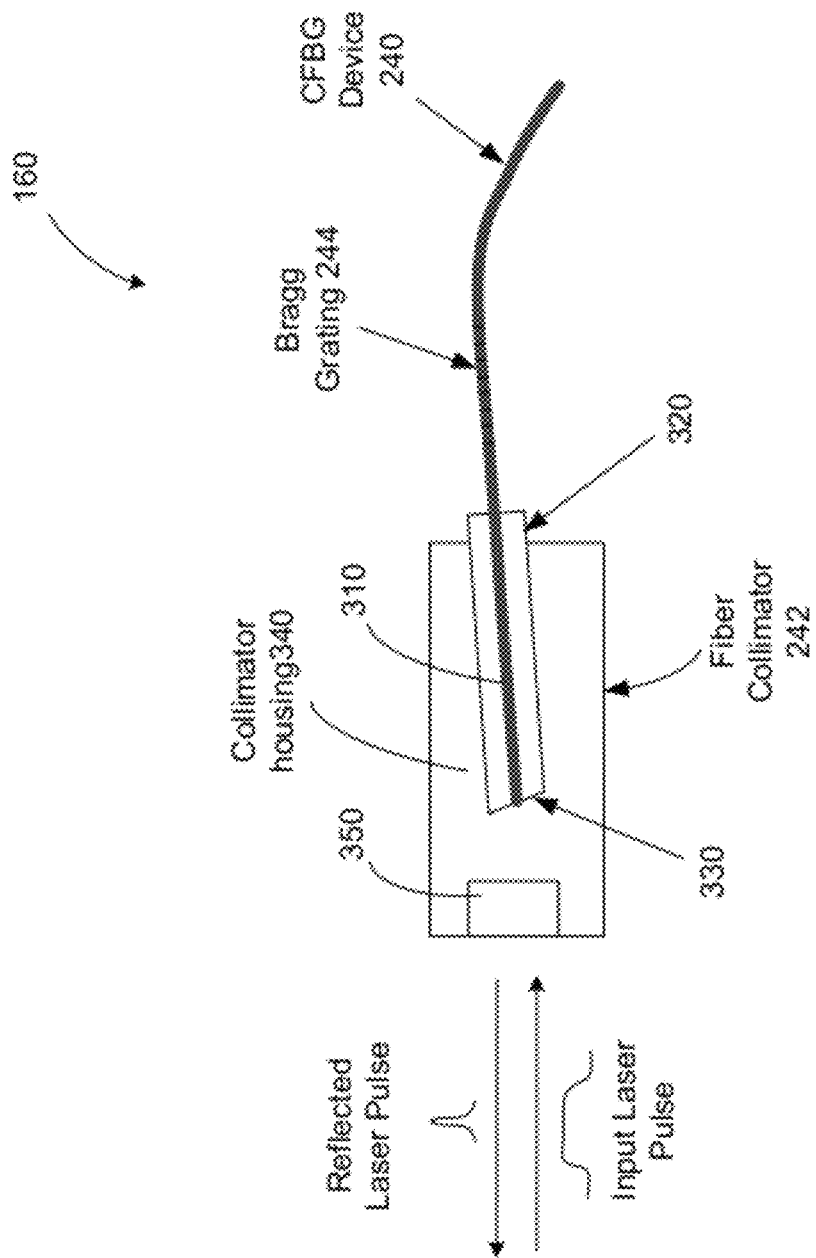
FIG. 3A shows detailed construction of an exemplified fiber collimator suitable for the CFBG pulse compressor in FIG. 2.

Referring to FIG. 1C, the laser head 20 includes an input optical port 161, a CFBG pulse compressor 160, beam shaping optics 250, a nonlinear optics device 260, and an output optical port 162. The CFBG pulse compressor 160 is configured to compress the initially stretched laser pulses, and can be constructed using examples described in this document (FIGS. 2 and 3A). The CFBG pulse compressor 160 is compact, lightweight and robust and can be used to facilitate fiber construction for a CPA device.

Notably, the CFBG pulse compressor 160 in FIG. 2 has separate input port 161 and output port 162 so that the compressed laser pulses produced by the CFBG pulse compressor 160 propagate along a different output optical path from that of the amplified and stretched laser pulses that enter the input port 161. This separation is provided so that the compressed laser pulses with a higher peak power produced by the CFBG pulse compressor 160 can be handled via carefully controlled output path to avoid undesired nonlinear optical effects due to the high peak power.

The deliver fiber 30 serves as a waveguide between the optical power amplifier 150 in the fiber laser driver 10 and the CFBG pulse compressor 160 in the laser head 20. The deliver fiber 30 can be constructed with Jacked protection armor that provides strength against pulling, bending, and squashing. The protection armor is also flexible to allow the laser head 20 to move freely. The delivery fiber 30 can preferably be single mode for the transmitted laser pulses, and can maintain polarizations of the transmitting laser pulses. In practice, mechanical disturbance can cause unfavorable variations in optical power, polarization, spectral amplitude and phase variations in the light passing through. Nonlinear optical effects can amplify and mix the unfavorable variations, such as amplification of amplitude variation, converting phase variations to amplitude variations, and so on. In the presently disclosed system, the laser light pass through the fiber preferable is kept at relative low intensity to minimize nonlinear effects generated in the delivery fiber 30.

The deliver fiber 30 is advantageous in many applications because the delivery fiber 30 is light weight, flexible and has a relatively low optical loss when compared with a mirror directed free space delivery path. For example, in various biomedical applications and material processing uses, the delivery fiber 30 allows an optical head containing the CFBG pulse compressor 160 to be a compact unit that can be situated at various target locations to deliver the compressed laser pulses with high peak power. The delivery fiber 30 also can be bended or routed to accommodate for the available space for routing the light to a target which can be a sample under imaging, therapy, surgery or diagnosis, or a piece of a material to be cut or treated.

On the other hand, the delivery fiber 30 can also cause undesired nonlinear optical effects in the amplified laser pulses propagating from the optical power amplifier 150 to the CFBG pulse compressor 160. As such, the delivery fiber 30 can be configured based on the optical power of the laser pulses to keep a undesired nonlinear effect below an acceptable level. For typical commercial fiber used in fiber communications, the fiber nonlinear coefficient is approximately $\gamma=10^{-3}$/m-watt. For many applications, the nonlinear effects are tolerable or acceptable if the following condition is met:

$$\gamma PL \ll 1,$$

where P is the peak optical power in Watt, and L is the fiber length in meter. Under this rough estimation, fiber delivery of compressed pulses with a peak power more than few kilowatts is not feasible due to undesired nonlinear optical effects such as SPM and Raman. The separation of the input path to the CFBG pulse compressor 160 and the output path of the CFBG pulse compressor 160 (FIG. 1B) offers a way to construct a very light weight and compact optical head (i.e. the laser head 20) for delivering the compressed laser pulses of high peak power to a target without using the delivery fiber 30, and to deliver stretched laser pulses with low peak optical power (e.g., tens of watts) to the CFBG pulse compressor 160 through the delivery fiber 30 without causing significant undesired nonlinear optical effects in the delivery fiber 30. Under this design, the length of the delivery fiber 30 can vary with specific requirements of an application, and can be, e.g., from several meters to tens of meters.

Referring to FIG. 2, the laser head 20 includes the input optical port 161 to receive input laser pulses at an input laser pulse repetition rate and polarized in an input linear polarization. A polarizing beam splitter 220 is provided to be in optical communication with the input optical port 161, e.g., via free space or a waveguide, to receive the input laser pulses and to direct the received input laser pulses along an optical path 221 out of the polarizing beam splitter 220 at the output port 162. When the delivery fiber 30 shown in FIGS. 1A-1C is used to direct the amplified stretched laser pulses from the optical power amplifier 150 to the CFBG pulse compressor 160, an input fiber collimator 210 can be provided to either in communication with or part of the input port 161. The output end of the delivery fiber 30 is coupled to the input fiber collimator 210 to collimate the light out of the delivery fiber 30. A chirped fiber Bragg grating device 240 is located in the optical path 221 to receive the input laser pulses from the polarizing beam splitter 220 and includes a fiber terminal section 310 held by a fiber collimator 242 that receives light from the polarizing beam splitter 220 via the optical path 221 and is sufficiently short in length to minimize or reduce pulse broadening or a nonlinear optical effect in each laser pulse propagating through the fiber terminal section. The function of the input fiber collimator 210 is to expand optical beam so that it can propagate in free space or other optical medium with low or no nonlinear effects. It can be implemented by a beam expansion lens followed which couples laser light into (in conjunction with other lens(es) such as 350). In FIG. 3A, the chirped fiber Bragg grating device 240 includes a chirped fiber Bragg grating section 244 connected to the fiber terminal section to reflect the input laser pulses and to compress pulse durations in the reflected laser pulses to produce reflected laser pulses with compressed pulse durations. The fiber terminal section 310 and the chirped fiber Bragg grating section 244 are formed by the same piece of fiber. The fiber Bragg grating is formed by well controlled exposure of UV light to fiber with special designed mask for space pattern, that is, grating.

A polarization rotator 230 is located in the optical path 221 between the polarizing beam splitter 220 and the chirped fiber Bragg grating device 240 to control the polarization of the reflected light from the polarization rotator 230 the chirped fiber Bragg grating device 240 to be orthogonal to the polarization of the light that is directed to the chirped fiber Bragg grating device 240. A Faraday rotator can be implemented as the polarization rotator 230 to rotate polarization of light by 45 degrees when the light passes through the Faraday rotator 230 and to collect and transmit the reflected laser pulses from the chirped fiber Bragg grating device 240 with compressed pulse durations to the polarizing beam splitter 220 which directs the reflected laser pulses from the Faraday rotator 230 with compressed pulse durations along an output path 222 that is separated from the input path 223 of the input laser pulses to the polarizing beam splitter 220.

In the example shown in FIG. 2, the CFBG pulse compressor 160 comprises the input fiber collimator 210, the polarizing beam splitter 220, the polarization rotator 230, the chirped fiber Bragg grating device 240, and the fiber collimator 242. The reflected laser pulses along the output path 222 are shaped by a lens 251 to enter the nonlinear optical device 260. The nonlinear optical device 260 can be implemented by a nonlinear crystal. The reflected laser pulses are again shaped by a lens 252 to arrive at the output optical port 162. The lenses 251 and 252 are part of the beam shaping optics 250 (FIG. 1C).

FIG. 3A shows an example of the design of the chirped fiber Bragg grating device 240. In this example, the fiber collimator 242 includes a collimator lens in optical communication with the fiber terminal section 310 of the chirped fiber Bragg grating device 240 to receive the input laser pulses from the Faraday rotator 230 and to direct the reflected laser pulses from the chirped fiber Bragg grating device 240 towards the Faraday rotator 230. A collimator housing 340 is provided to hold a beam expansion lens such as a collimator lens 350 relative to the fiber terminal section 310 of the chirped fiber Bragg grating device 240. In one implementation, the collimator lens 350 is a micro-optics lens. A fiber ferrule 320, e.g., a glass ferrule, holds the fiber terminal section 310 at a tilted position relative to the optical axis of the collimator lens 350 and is fixed to the collimator housing 340. The end facet 330 of the fiber terminal section 310 forms an angle relative to a longitudinal direction of the fiber terminal section 310. The end facet is located at the focal point of the collimator lens 350 and forms a first tilt angle between 78 and 86 degrees relative to the fiber axial direction. For example, the first tilt angle is about 82 degrees relative to the fiber axial direction or 8 degrees relative to the lateral direction. The fiber ferrule 320 is tilted at a second tilt angle between 3.4 degrees and 4.2 degrees, e.g., 3.8 degrees relative to the optical axis of the collimating lens 350. In one exemplified implementation, the length of the chirped fiber Bragg grating section 244 is between 1 cm and 5 cm; the fiber diameter is about 0.125 mm; the diameter of the fiber ferrule 320 is between 2 mm and 3 mm. The collimating lens 350 has a diameter smaller than 7 mm, or in a range between 1 mm and 3 mm. The collimating lens 350 has a focal length shorter than 30 mm. The thickness of the collimating lens 350 is between 0.5 mm and 4 mm. Notably, under this design, the fiber terminal section 310 of the chirped fiber Bragg grating device 240 is sufficiently short in length to minimize or reduce a nonlinear optical effect in each laser pulse propagating through the fiber terminal section 310 and is free from a fiber splicing junction with another fiber. For example, the fiber terminal section 310 is shorter than 2 cm, and sometimes 2-5 mm, which 1/10 of the lead fiber length required by state-of-art fiber splicing in conventional methods and systems.

Figure 3B:
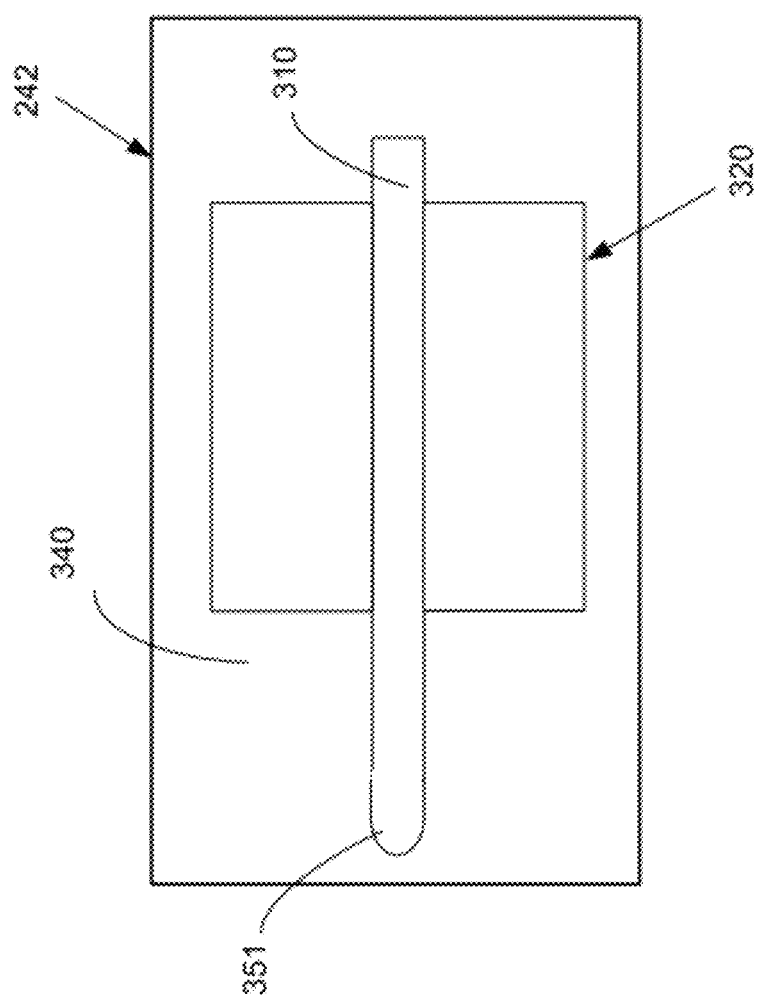
FIG. 3B shows another exemplified fiber collimator suitable for the CFBG pulse compressor in FIG. 2.

FIG. 3B shows another method to implement the beam expansion lens to couple laser light into the fiber terminal section 310 (FIG. 3A). Instead of the collimator lens 350 (FIG. 3A), a lens-shaped fiber end 351 is constructed at the fiber termination section. A lens-shaped fiber end 351 at the end of the fiber terminal section 310 in the CFBG device 240 can performance the function of the collimating lens 350 in FIG. 3A. The lens-shaped fiber end 351 has substantially the same diameter as the fiber terminal section 310. The collimating lens 350 can be eliminated. Such lens-shaped fiber end 351 can be made by well controlled process of heating and cooling glass fiber end, so that desired glass end surface is formed after the process. The fiber terminal section 310 with its lens-shaped fiber end 351 is fixedly held by the fiber ferrule 320. In FIG. 3B, the CFBG 240 is only showing the part of the fiber terminal section 310. For simplicity, chirped fiber Bragg grating section 244 (FIG. 3A) which is followed the fiber terminal section 310 is not shown in FIG. 3B.

In some implementations, one end of the Chirped Fiber Bragg Grating fiber, usually the blue end with larger chirped grating periods than the other red end, is inserted into the fiber ferrule 320. The fiber ferrule 320 is polished (usually angle polished) to yield optical finish fiber end 330. An anti-reflection coating can be applied to the end 330 to reduce reflection from about 4% to 0.1%. The polished fiber ferrule 320 is inserted into the collimator housing 340. The fiber end is aligned to near the focal point of the collimating lens 350 to form a fiber collimator. The tilting of the fiber ferrule 320 relative to the optical axis and the collimating lens is optimized to prevent the tail of the Gaussian beam from being reflected back into the collimating lens without proper pulse compression. For example of using standard PM Panda fiber with NA~0.12, at a second tilt angle of approximately 3.8 degrees, the reflected optical power is reduced to 10E-6 (−60 dB) of the input power. The chirped fiber Bragg grating device 240 is fiber based and is very compact. Other components of the CFBG pulse compressor 160 are made of micro-optical components. The laser head 20 can thus be made very compact. For most laser applications, a small laser head with a flexible and robust connection to a laser driver is highly desirable. The compactness enables a lot of application in bio-medical, semiconductor equipment manufacturing, scientific discovery and fundamental research. The presently disclosed fiber CPA device 100 (FIG. 1A) can generate femtosecond laser pulse with a laser head 10-100 times smaller than conventional systems.

The Chirp fiber Bragg grating (CFBG) in the above design is used to compress high energy chirp laser pulse. The CFBG is put into a micro-optical setup which reduces nonlinearity of the fiber. The setup also enables using the fiber nonlinear effect of the fiber terminal section 310 and the CFGB section 244 to compress pulses to shorter pulse width than a linear compression system. This pulse compressor enables construction of fiber chirped pulse amplification system at a higher energy.

In some embodiments, referring to FIG. 1B, the fiber pulse stretcher 130 can facilitate matching of dispersion of the optical fiber with the dispersion in the CFBG pulse compressor 160. The dispersion of the optical fiber is proportional to the fiber length whereas and the dispersion in the CFBG pulse compressor 160 is usually fixed after fabrication.

Fiber lasers have many advantages including compactness, maintenance-free operation, and cost-effectiveness, compared to other lasers. Due to waveguiding nature of optical fibers, they are superior when the beam quality is concerned. However, the same waveguiding nature renders it difficult to amplify short pulses with high peak power. The high peak power of the laser pulses causes Kerr effects in fiber material, which gives rise to undesired nonlinearities such as self-phase modulation. Once the pulse experience the accumulation of nonlinearities, it becomes difficult to obtain short pulses. A Chirped pulse amplifier system (CPA) is a method to get short pulse and high energy. The basic idea is that the low energy short laser pulse is passing through a stretcher to obtain wide pulse width. A stretcher is typically a setup with large group velocity dispersion. The stretched pulse is then passing through high power optical amplifier to boost the energy of laser pulse. The wide pulse width reduces the peak power in the optical amplifier, therefore reduce the nonlinearity. The high energy stretched pulse is then passing through a pulse compressor to obtain short laser pulse typically much smaller than a picosecond. A pulse compressor is typically a setup with opposite group velocity dispersion of that of a pulse stretcher.

The presently disclosed compact CPA laser device can reduce the fiber length and significantly minimize nonlinear effects in the laser pulses in comparison to conventional fiber laser systems. The lead fiber length for CFBG can be reduced to 2-5 mm, which is a factor of 1/10 or smaller than the lead fiber length in conventional fiber laser systems. The laser pulses are coupled into a CFBG pulse compressor in optical path through free space. Since the non-linear coefficient of air is about 1000 times lower than that of a silica glass in an optical fiber, the nonlinear effects associated with CFBG compressor in the present CPA laser device are reduced by a factor of 10-100 lower comparing to conventional fiber splicing techniques. The quality of the output amplified laser pulses is significantly improved.

Referring to FIG. 1C, the energy level of laser pulses at the CFBG pulse compressor 160 can be much higher (e.g., 10-1,000,000 times) than that at the fiber pulse stretcher 130 due to optical amplification of the optical power amplifier 150 between the fiber pulse stretcher 130 and the CFBG pulse compressor 160. Managing the optical nonlinearity is a major concern in such a system. Many single mode fiber compressor designs can only tolerate laser pulse energy of a few nanojoules due to limited core diameter of most single mode fibers and the long fiber length required to achieve the required compression. A chirped fiber Bragg grating can be coupled by fusion splice to another fiber to construct a pulse compressor. The existing fusion splice technologies need 0.1-1 meter of fiber length for the fusion spice and this length of fiber in the fusion splice introduces optical nonlinearities that limit the energy level of compressed laser pulses less than a few nanojoule.

The design of the CFBG compressor shown in FIGS. 2 and 3A provides the CFBG chirped fiber Bragg grating in a mico-optics setup to achieve a high energy (e.g., several nano joules to greater than 100 nanojoules) compression in a compact form. By using micro optics as shown in FIGS. 2 and 3A, the lead length for the fiber terminal section 310 of the CFBG device 240 can be cut down to few mm length which is one to three order of magnitude less than what can be achieved in fusion splice and other techniques. In implementations, the length of the fiber terminal section 310 can be a few millimeters and less than 10 centimeters. This design lets short pulses and high energy pulses to propagate in fiber for a significant distance. This reduces nonlinear interaction length and increase maximum compressible pulse energy.

The present CFBG compressor design can also be used to compress the laser pulses further in the fiber to achieve a shorter pulse width than that of a linear pulse compressor. Optical fiber has nonlinear optical self-phase modulation (SPM), which can generate new frequency components. With optimal control of SPM and dispersion, a significant pulse compression can be achieved in the CFBG compressor a micro-optics setup.

In matching dispersion of the pulse stretcher 130 (FIG. 1B) to the dispersion of the CFBG pulse compressor 160 (FIG. 1C), the following process can be implemented. The fiber pulse stretcher 130 can be made of fiber in which the length can be controlled by fusion splice, even during the finally assembly of CPA system. One limitation for fiber dispersive devices is that the ratio of the 2nd order dispersion and 3rd order dispersion is fixed for a fiber because the ratio is related to fiber material properties and the waveguide design. The pulse compressor is made of a chirped fiber Bragg grating (CFBG) and its dispersion can be well controlled and engineered prior to CPA manufacturing. Especially that 2nd order dispersion and third order dispersion can be adjusted to various values. The combination of fiber stretcher and CFBG compressor offers an easy way to match the 2nd order dispersion as well the 3rd order dispersion during the manufacturing process.

Figure 4A:
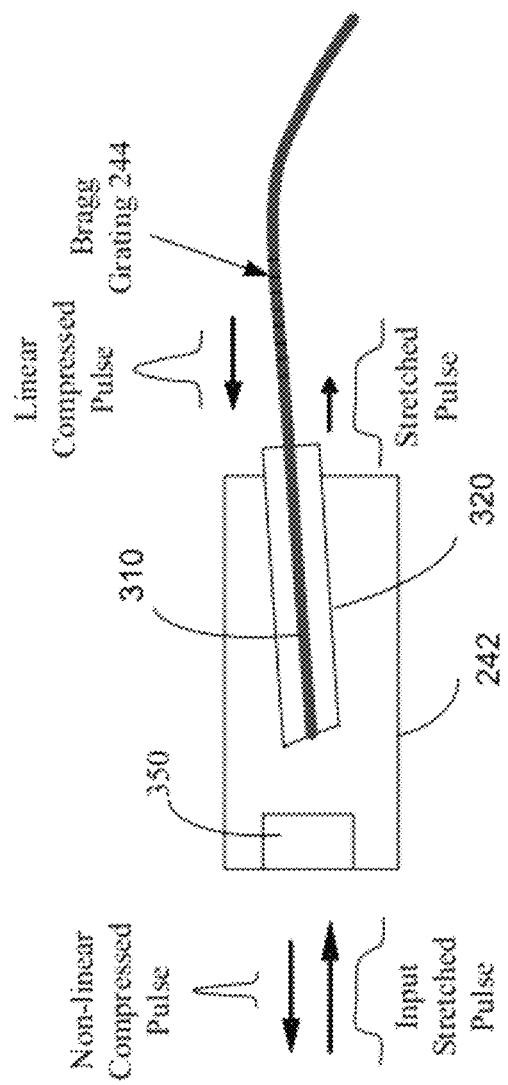
FIG. 4A illustrates an operation of the chirped fiber Bragg grating compressor in FIGS. 2-3B.

In FIG. 3A, the fiber length of the fiber terminal section 310 between the fiber end 330 and the fiber Bragg grating section 244 is an important factor that determines the magnitude of nonlinear effects during the compression. This length is minimized during a linear compression. This length of fiber can be controlled for pulse compression when the dispersion in this part of fiber is anomalous. One limitation in CPA is the bandwidth narrowing in the fiber power amplifier which usually limits a Er/Yb fiber amplifier to have a bandwidth less than 20 nm. For a linear compressor such as a bulk grating compressor, the shortest pulsewidth achievable from a 20-nm long fiber amplifier may be about 0.18 ps in some designs. This is a significant limitation to many applications. The present fiber pulse compression can overcome this limitation. One example of this design is to have stretched pulses with a pulse duration of 100 ps, a linear chirped bandwidth of 18 nm with a pulse energy of 5.5 nJ. This stretched wide pulse is directed into the collimator lens of the CFBG compressor as shown in FIG. 4A.

In FIG. 3A, the wide pulses enter the fiber tip 330 to propagate towards the fiber Bragg Grating section 244. Since the wide pulse has a low peak power (e.g., 5.5 nJ/100 ps=55 W), the pulse reaches the fiber Bragg Grating section 244 with its time domain shape and spectrum content with almost no change. The fiber Bragg grating section 244 can be designed to produce nearly exact opposite dispersion to compress the spectral contents in the wide pulse to a short pulse. The fiber Bragg grating section 244 can be designed to have a high reflectivity (e.g., 90%) so that the reflected pulse has 5 nJ energy. The fiber Bragg Grating section 244 can be designed to short (e.g., about 1 cm) for compressing 100-ps pulses, the pulses are linearly compressed to about 0.2 ps. This 0.2 ps pulse with 5 nJ pulse energy has a peak power of about 25,000 W. This pulse experiences a high SPM which generates a new spectral content that interacts with anomalous dispersion to compress the pulse to a short width. For example, a 0.2 ps, 5 nJ pulse can be so compressed to 77 fs pulsewidth in a PM panda fiber (MFD=10.5 µm, D=17 ps/nm/km) with peak power greater than 40,000 W.

Figure 4B:
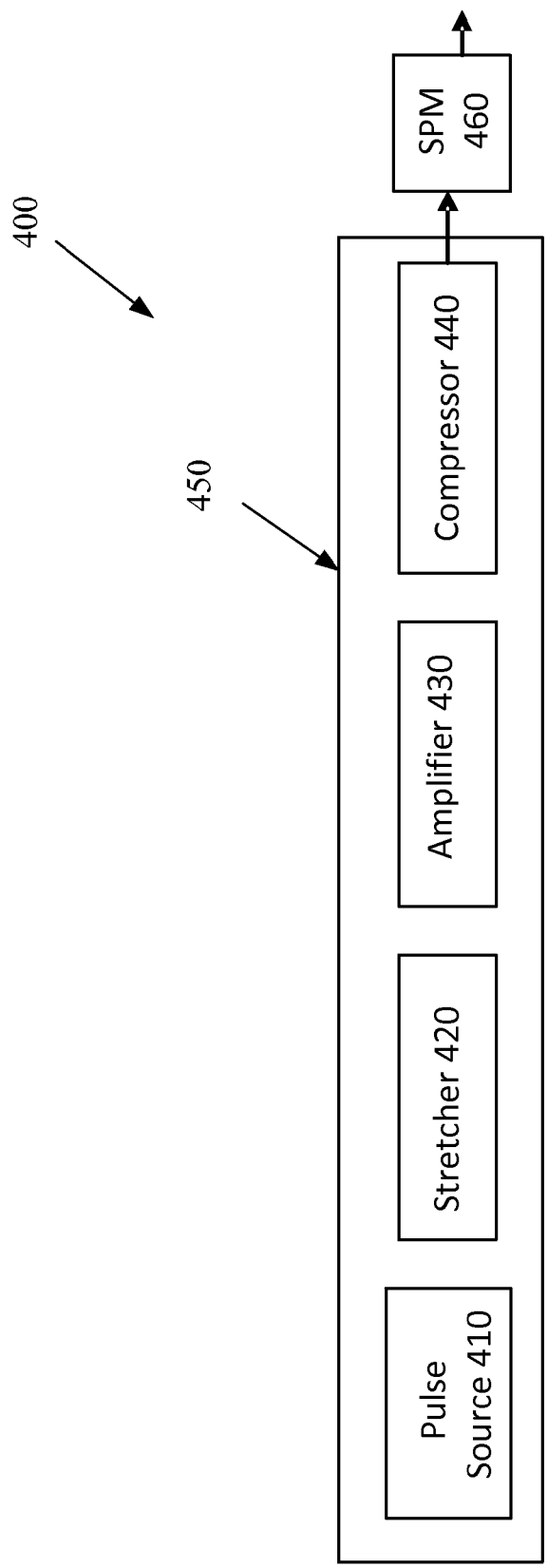
FIG. 4B Illustrates an enhanced chirped pulse amplifier system where a self-phase-modulation device is used after pulse compressor.

FIG. 4B shows a novel design to an enhanced conventional chirped pulse amplifier system 400 comprising an optical device 450 and a self-phase-modulation (SPM) device 460. The optical device 450 includes a pulse source 410, a stretcher 420, amplifier 430, and a compressor 440 for producing a shorter pulse output. The SPM device 460 is positioned downstream to the compressor 440 and is configured to broaden the optical spectrum (i.e. the wide bandwidth) of the compressed amplified laser pulses to be broader than the optical spectrum of the amplified laser pulses produced by the amplifier 430. The SPM device 460 thus overcomes the bandwidth limitation of the amplifier 430. As a result of the bandwidth broadening, the chirped pulse amplifier system 400 can output narrower laser pulses than conventional chirped pulse amplifier systems.

Referring to FIGS. 1A-1C, 2 and 4B, the SPM device 460 can be placed in the laser head 20 downstream to the CFBG pulse compressor 160. The SPM device 460 is configured to broaden the optical spectrum of the reflected laser pulses by the CFBG pulse compressor 160, which makes the reflected laser pulses to be broader than the optical spectrum of the amplified stretched laser pulses.

Figure 5A:
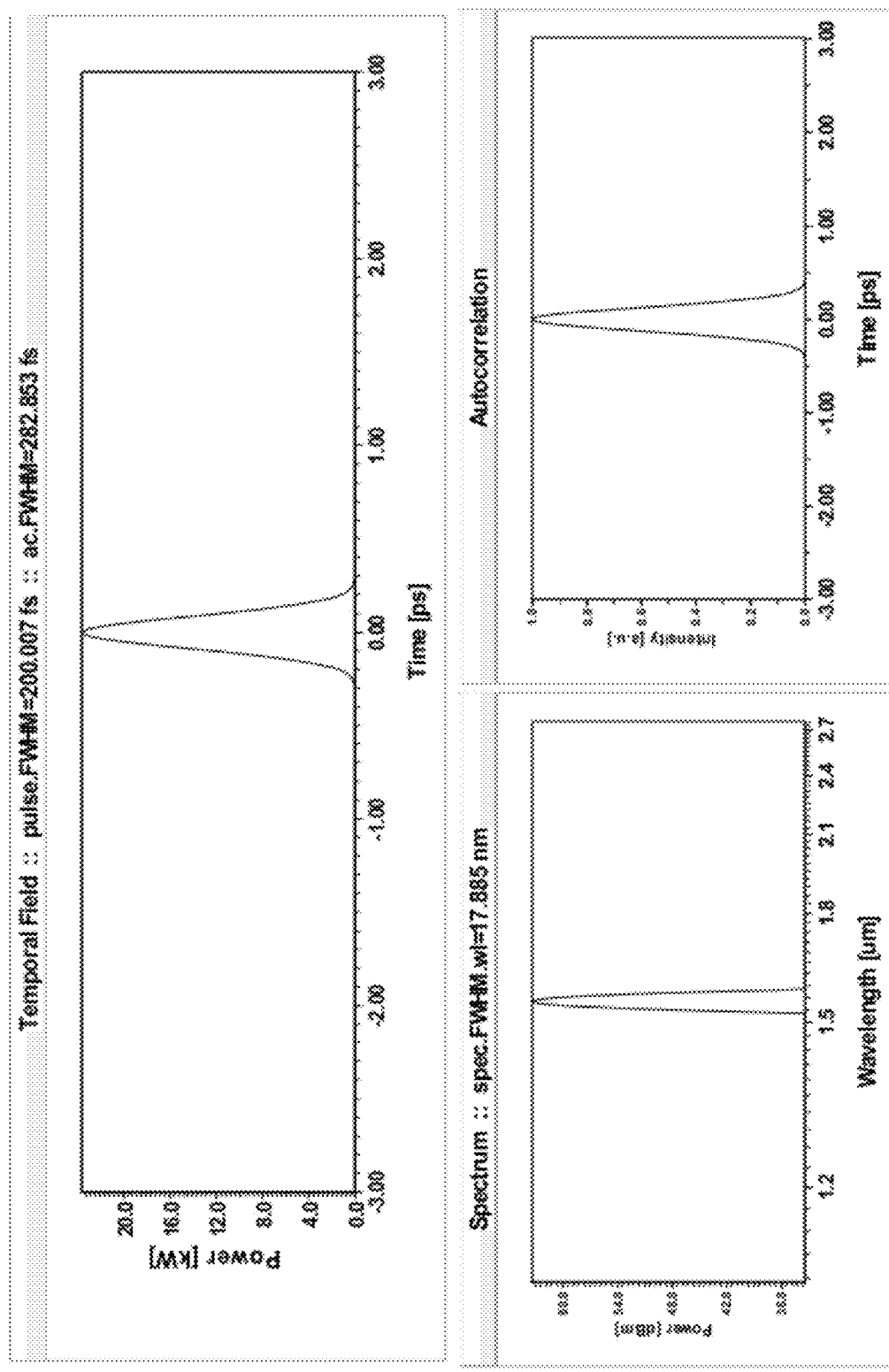
FIGS. 5A and 5B show simulation of fiber nonlinear pulse compression where
Figure 5B:
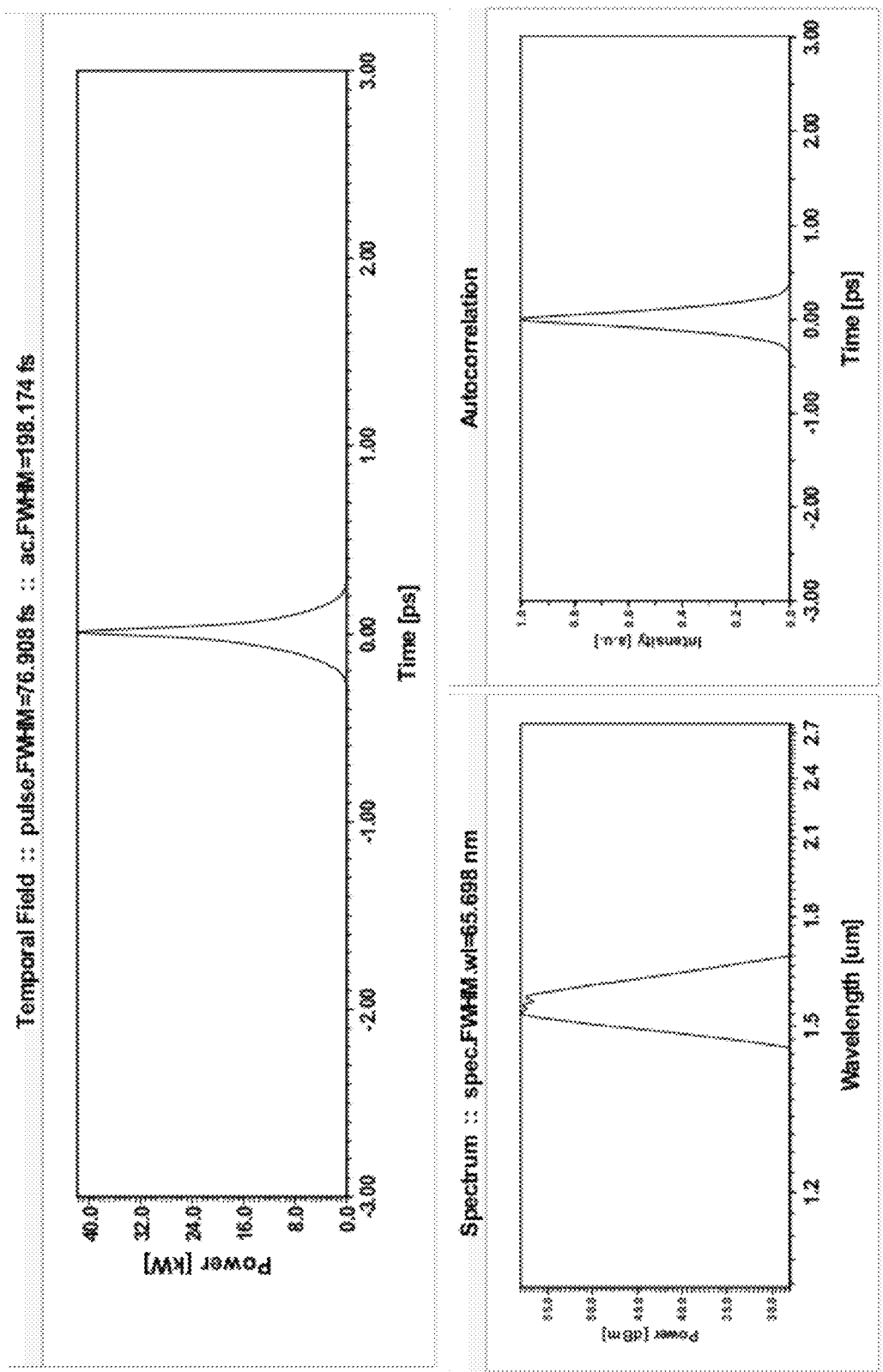

FIGS. 5A and 5B show simulation of fiber nonlinear pulse compression where FIG. 5A shows the pulse parameter before nonlinear pulse compression and FIG. 5B shows the pulse parameter after nonlinear pulse compression in a 80 mm long PM panda fiber. This extra length of fiber is what is shown as the fiber terminal section 310 in FIG. 3A.

For fiber laser at 1 µm band, normal fiber has normal dispersion. The linear CFBG pulse compression can be done by keep the fiber after the Bragg Grating short, e.g. about several millimeters in some implementations. To achieve nonlinear pulse compression, the CFBG can be formed on a special photonics crystal fiber which has anomalous dispersion at 1 µm, or the light output from CFBG pulse compressor can be coupled back into a special fiber (such as photonics crystal fiber) with anomalous dispersion.

Notably, the device in FIGS. 1-3A can be designed to control proper dispersion and self-phase modulation to achieve pulse compression based on a soliton effect within the device. Referring to FIG. 3A, the fiber terminal section 310 is designed or structured to have anomalous group velocity dispersion. The high peak power pulse output by the CFBG grating generates SPM when the compressed pulses pass through the fiber terminal section 310. The dispersion and the SFM effects in the fiber terminal section 310 can act as a compressor by itself to cause soliton pulse compression. The soliton pulse compression mechanism in the fiber terminal section 310 is related to a fundamental property of higher-order solitons.

FIGS. 5A and 5B show the simulation of a practical example of such a compression based on the soliton effect and show the laser pulse evolution in the fiber terminal section 310 with the SPM, dispersion and Raman effects.

Referring to FIG. 2, the compressed pulses output by the CFBG pulse compressor at the output port 162 can be further converted to laser pulses at a different optical wavelength using the nonlinear optical device 260. Focusing optics can be used to focus the compressed laser pulses into the nonlinear crystal at the output of the CFBG compressor to cause conversion of energy of the focused input laser pulses to energy of new laser pulses at other wavelengths based on a nonlinear optical effect, e.g., frequency doubling of a second harmonics generator (SHG). Frequency tripling and quadrupling nonlinear effects can be also use to convert the wavelength to even shorter output wavelengths. In addition, other nonlinear effects, such as, nonlinear optical parametric process and difference frequency generation techniques, can be used to convert the wavelength to longer wavelengths by placing a proper nonlinear optical crystal at the output of the CFBG compressor under proper optical pumping conditions. The high peak power obtained after the pulse compression makes the above nonlinear conversion efficient.

The CFBG pulse compressor 160 can be made of a single mode fiber to produce an output beam of a high beam quality. This facilitates the focusing of the laser output into the nonlinear optical device 260. For laser pulses at 1.55 μm, PPLN can be a convenient crystal to generate laser pulses at 775 nm based on second harmonic generation by directing the amplified and compressed laser pulses at 1.55 μm through the crystal. A collimating lens at 780 nm can be used to collimate the laser pulses at 775 nm. For laser pulses at 1 μm, a Mg:P-PLN, KTP or LBO crystal can be used for efficient second harmonic conversion.

The compressed laser pulses with high peak power generated from the fiber-based CPA device 100 in FIGS. 1A-1C can be used in a wide range of applications, including imaging, diagnostics, material measurements, medical treatment, surgery and material processing. One of the important applications of short laser pulses is for biomedical multi-photon imaging, it requires laser pulse source to have high peak power to enable strong multiphoton signal. It requires low average power to avoid thermal damage to the live tissues. Ultrafast fiber pulse laser is a good source for biomedical multi-photon imaging. Multi-Photon Imaging (MPI) mostly involves two-photon microscopy. MPI is a fluorescence technique that allows imaging living tissue up to a depth of one millimeter. Two-photon excitation may be a viable alternative to confocal microscopy due to its deeper tissue penetration and reduced photooxicity.

Figure 6:
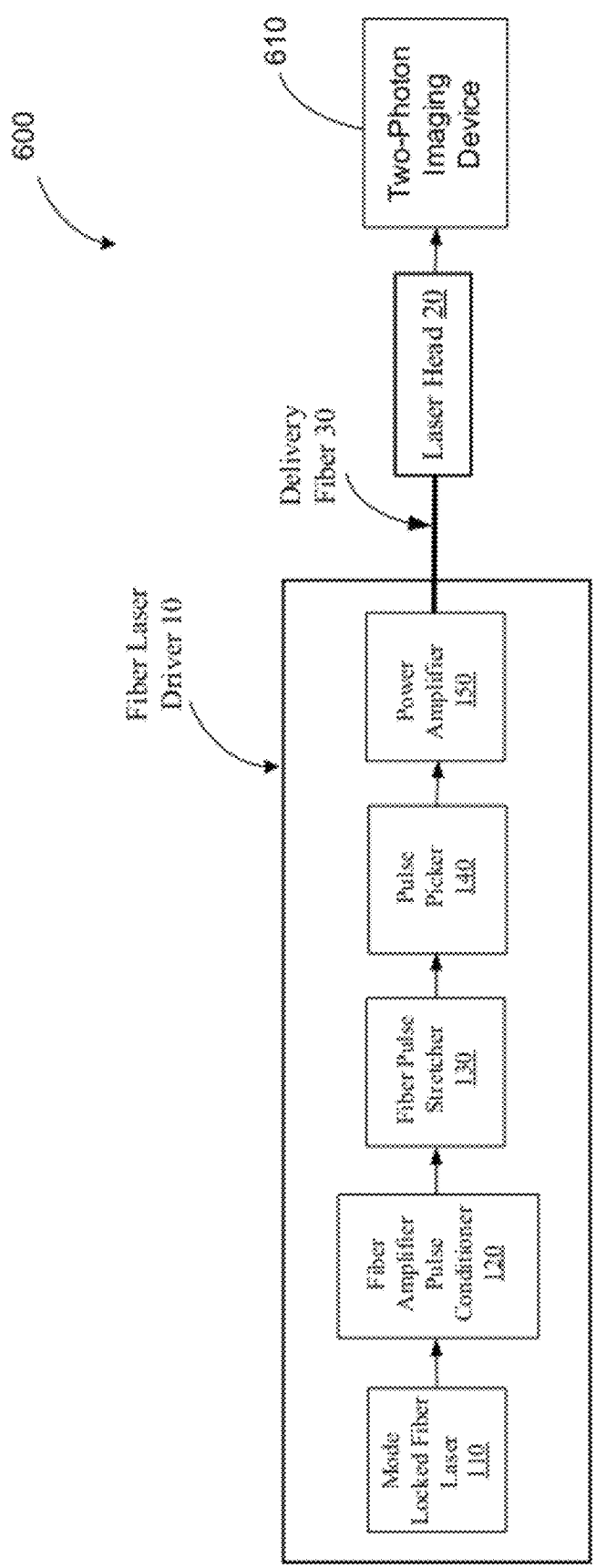
FIG. 6 shows an example of a pulsed laser system for two-photon imaging.

Referring to FIG. 6, a fiber CPA device 600 includes a fiber laser driver 10, a laser head 20, a deliver fiber 30 connecting the fiber laser driver 1 and the laser head 20. of the fiber CPA device 600 further includes a two-photon imaging device 610 for obtaining images of a sample. The two-photon imaging device 610 receives the compressed laser pulses with high peak power generated from the fiber-based CPA device 100 in FIGS. 1A-1C. The device 610 guides the laser pulses into the sample to cause generation of two-photon fluorescence in the sample due to localized two-photon absorption. The two-photon imaging device 610 collects the light of the two-photon fluorescence from the sample to obtain images of the sample. Two-photon excitation is based on the idea that two photons of low energy can excite a fluorophore in a quantum event, resulting in the emission of a fluorescence photon, typically at a higher energy than either of the two excitatory photons. The probability of the near-simultaneous absorption of two photons is low. Therefore a high flux of excitation photons is required. In two-photon excitation microscopy, an infrared laser beam is focused through an objective lens. Femtosecond fiber lasers can provide maintenance free, reliable, compact and low cost features and thus are good light sources for two-photon microscopy.

For machining and surgical applications, a pulse width under 1 picosecond works through ablation rather than heating and melting. Energy deposited by the laser upon a surface cannot thermally propagate a significant distance into the material during the time of the pulse, so thermal effects and mechanical stresses are significantly reduced. Deposition of energy in sub-picosecond times causes the surface material to become a plasma that consumes the pulse energy and dissipate in a gas phase, leaving a clear cutting edge. The uncut material remains in original form with greatly reduced stress, fractures, melts, or other unwanted thermal processes. In contrast, a laser with nanosecond or longer pulses, will leave a large "heat affected zone" around the cutting edge, as well as numerous stress fractures.

In these and other applications, the two-photon imaging device 610 can be replaced by a respective optical module such as a laser head for laser cutting and a laser head for laser surgery.

Therefore, a method for amplifying laser pulses is provided. This method includes modifying a train of input laser pulses at an input pulse repetition rate to stretch a pulse duration of each input laser pulse to produce a train of stretched laser pulses; directing the train of stretched laser pulses into an optical power amplifier to amplify the stretched laser pulses; guiding the stretched laser pulses that are amplified by the optical power amplifier through an input optical path; coupling the stretched laser pulses that are amplified by the optical power amplifier from the input optical path into a chirped fiber Bragg grating configured as a pulse compressor, to obtain reflected laser pulses from the chirped fiber Bragg grating with compressed pulse durations; and directing the reflected laser pulses from the chirped fiber Bragg grating with compressed pulse durations along an output optical path in free space, without going through fiber, to produce amplified output laser pulses with compressed pulse durations. The stretching of the laser pulses can cause the pulse duration greater than 20 ps and the pulse duration of the reflected laser pulses from the chirped fiber Bragg grating can be less than 3 ps.

In addition, a laser pulse amplifier device is provided. This device includes a laser pulse stretcher that modifies a train of input laser pulses at an input pulse repetition rate to stretch a pulse duration of each input laser pulse to produce a train of stretched laser pulses, an optical power amplifier that amplifies power of the stretched laser pulses from the pulse stretcher; a delivery fiber line coupled to receive the amplified stretched laser pulses from the optical power amplifier and to guide the amplified stretched laser pulses in a first linear polarization; a polarizing beam splitter that receives the amplified stretched laser pulses from the delivery fiber line in the first linear polarization to direct the received amplified stretched laser pulses along an optical path; and a chirped fiber Bragg grating device located in the optical path to receive the amplified stretched laser pulses from the polarizing beam splitter. This chirped fiber Bragg grating device includes a fiber terminal section that receives light from the polarizing beam splitter via the optical path and is sufficiently short in length to minimize or reduce or minimize broadening of each laser pulse propagating through the fiber terminal section, and a chirped fiber Bragg grating section connected to the fiber terminal section to reflect the amplified stretched laser pulses and to compress pulse durations in the reflected laser pulses to produce reflected laser pulses with compressed pulse durations. A polarization rotator is located in the optical path between the polarizing beam splitter and the chirped fiber Bragg grating device to rotate polarization of light to render the reflected laser pulses from the chirped fiber Bragg grating device with compressed pulse durations in a second linear polarization that is orthogonal to the first polarization so that the polarizing beam splitter directs the reflected laser pulses from the polarization rotator with compressed pulse durations along an output path that is separated from a path of the amplified stretched laser pulses from the delivery fiber line to the polarizing beam splitter and is in free space without going through fiber.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:

1. A chirped-pulsed amplification laser device, comprising:
   a fiber laser driver, comprising:
      a seed pulsed laser configured to produce a train of input laser pulses;
      a pulse stretcher configured to stretch pulse durations of the train of input laser pulses to produce a train of stretched laser pulses; and
      an optical power amplifier configured to amplify the stretched laser pulses to produce amplified stretched laser pulses;
   a laser head, comprising:
      a chirped fiber Bragg grating compressor, comprising:
         a fiber terminal section configured to receive the amplified stretched laser pulses, wherein the fiber terminal section has a length shorter than 10 centimeters to minimize broadening of the amplified stretched laser pulses;
         a chirped fiber Bragg grating section connected to the fiber terminal section and configured to compress and reflect the amplified stretched laser pulses to produce reflected laser pulses with compressed pulse durations; and
         a collimator housing configured to fixedly hold a collimator lens that is configured to focus the amplified stretched laser pulses at an end facet of the fiber terminal section and to direct the reflected laser pulses to transmit in free space, wherein the collimator housing is configured to hold the fiber terminal section tilted relative to an optical axis of the collimator lens; and
   a delivery fiber configured to guide the amplified stretched laser pulses from the laser driver to the laser head.

2. The chirped-pulsed amplification laser device of claim 1, wherein the fiber terminal section has a length between 5 mm and 20 mm.

3. The chirped-pulsed amplification laser device of claim 1, wherein the fiber terminal section and the chirped fiber Bragg grating section are structured to maintain polarizations of the amplified stretched laser pulses.

4. The chirped-pulsed amplification laser device of claim 1, further comprising:
   a ferrule configured to hold the fiber terminal section, wherein the collimator housing is configured to fixedly hold the ferrule, wherein the end facet is tilted relative to an axial direction of the fiber terminal section.

5. The chirped-pulsed amplification laser device of claim 4, wherein the end facet is tilted relative to an axial direction of the fiber terminal section at a first tilt angle in a range between 78 and 86 degrees, wherein the ferrule is configured to hold the fiber terminal section tilted relative to an optical axis of the collimator lens at a second tilt angle is between 3.4 degree and 4.2 degree.

6. The chirped-pulsed amplification laser device of claim 1, further comprising:
   a polarizing beam splitter configured to receive the amplified stretched laser pulses in the first linear polarization in free space and to direct the amplified stretched laser pulses along a first optical path in free space.

7. The chirped-pulsed amplification laser device of claim 6, further comprising:
   a polarization rotator located between the polarizing beam splitter and the chirped fiber Bragg grating compressor, the polarization rotator being configured to rotate polarization of the reflected laser pulses to a second linear polarization that is orthogonal to the first polarization to allow the polarizing beam splitter to direct the reflected laser pulses to transmit in a second optical path in free space.

8. The chirped-pulsed amplification laser device of claim 1, wherein the reflected laser pulses have compressed pulse durations shorter than 3 ps.

9. The chirped-pulsed amplification laser device of claim 1, wherein the pulse stretcher is structured to make the stretched laser pulses to have pulse duration greater than 20 ps.

10. The chirped-pulsed amplification laser device of claim 1, further comprising:
    a two-photon imaging device configured to receive the reflected laser pulses with compressed pulse durations from the chirped fiber Bragg grating compressor to produce two-photon microscopic imaging of a sample under illumination of the reflected laser pulses.

11. The chirped-pulsed amplification laser device of claim 1, further comprising
    a self-phase-modulation (SPM) device configured to broaden an optical spectrum of the reflected laser pulses to be broader than an optical spectrum of the amplified stretched laser pulses.

12. The chirped-pulsed amplification laser device of claim 1, wherein the fiber terminal section is configured to receive the laser pulses at an end facet, wherein the fiber terminal section is configured to limit and control nonlinear effects in the laser pulses;
    wherein the chirped fiber Bragg grating compressor further comprises a beam expansion lens configured to expand laser light comprising the laser pulses at the end facet of the fiber terminal section and to direct the reflected laser pulses to transmit in free space.

13. The chirped fiber Bragg grating compressor of claim 12, wherein the beam expansion lens is formed by a micro-optics lens.

14. The chirped-pulsed amplification laser device of claim 12, wherein the beam expansion lens is formed by a lens-shaped fiber end.

15. The chirped fiber Bragg grating compressor of claim 12, wherein the beam expansion lens is a collimating lens.

16. The chirped fiber Bragg grating compressor of claim 12, further comprising a ferrule configured to fixedly hold the fiber terminal section relative to the beam expansion lens, wherein the fiber terminal section is inside the ferrule.

* * * * *